United States Patent
Kim et al.

(10) Patent No.: US 9,601,792 B2
(45) Date of Patent: Mar. 21, 2017

(54) FUEL CELL SYSTEM AND METHOD FOR DRIVING SAME

(71) Applicant: DOOSAN HEAVY INDUSTRIES & CONSTRUCTION CO., LTD., Changwon-Si (KR)

(72) Inventors: Sung Hoon Kim, Anyang-si (KR); Choa Moon Yun, Daejeon (KR); Tae Hee Kim, Daejeon (KR); Gi Pung Lee, Daejeon (KR); Tae Won Lee, Daejeon (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 70 days.

(21) Appl. No.: 14/363,057

(22) PCT Filed: Nov. 28, 2012

(86) PCT No.: PCT/KR2012/010177
§ 371 (c)(1),
(2) Date: Jun. 5, 2014

(87) PCT Pub. No.: WO2013/085216
PCT Pub. Date: Jun. 13, 2013

(65) Prior Publication Data
US 2014/0349144 A1 Nov. 27, 2014

(30) Foreign Application Priority Data
Dec. 5, 2011 (KR) .................. 10-2011-0129169

(51) Int. Cl.
*H01M 8/06* (2016.01)
*H01M 8/04* (2016.01)
(Continued)

(52) U.S. Cl.
CPC ..... *H01M 8/0662* (2013.01); *H01M 8/04014* (2013.01); *H01M 8/0494* (2013.01);
(Continued)

(58) Field of Classification Search
None
See application file for complete search history.

(56) References Cited

U.S. PATENT DOCUMENTS

| 3,666,682 A | 5/1972 | Muenger |
| 2003/0162067 A1 | 8/2003 | McElroy |

(Continued)

FOREIGN PATENT DOCUMENTS

| DE | 19637207 A1 | 3/1998 |
| DE | 10234263 A1 | 2/2004 |

(Continued)

OTHER PUBLICATIONS

International Search Report for PCT/KR2012/010177 dated Feb. 27, 2013.
(Continued)

*Primary Examiner* — Patrick Ryan
*Assistant Examiner* — Wyatt McConnell
(74) *Attorney, Agent, or Firm* — Sughrue Mion, PLLC

(57) ABSTRACT

The present application relates to a fuel cell system and a method for driving same, which can produce stable electricity, enhance load following capability, and simultaneously increasing fuel utilization rate and energy efficiency by separately managing a base load and a load following of a fuel cell, and the fuel cell system according to one embodiment of the present application comprises: a molten carbonate fuel cell for generating electricity by using fuel; a reaction gas for shifting discharge gas into water gas; a buffer tank for storing the water gas; and a driving device (Continued)

which is actuated by using the water gas that is stored and provided from the buffer tank.

5 Claims, 5 Drawing Sheets

(51) Int. Cl.
*H01M 8/24* (2016.01)
*H01M 8/10* (2016.01)
*H01M 8/14* (2006.01)

(52) U.S. Cl.
CPC ... *H01M 8/04156* (2013.01); *H01M 8/04201* (2013.01); *H01M 8/04604* (2013.01); *H01M 8/04731* (2013.01); *H01M 8/04738* (2013.01); *H01M 8/04753* (2013.01); *H01M 8/0668* (2013.01); *H01M 8/2495* (2013.01); *H01M 2008/1095* (2013.01); *H01M 2008/147* (2013.01); *H01M 2250/10* (2013.01); *Y02B 90/14* (2013.01); *Y02E 60/50* (2013.01); *Y02E 60/526* (2013.01)

(56) References Cited

U.S. PATENT DOCUMENTS

| | | | |
|---|---|---|---|
| 2004/0126640 A1* | 7/2004 | Sanderson | H01M 8/04022 429/415 |
| 2004/0229092 A1 | 11/2004 | Take | |
| 2005/0058863 A1* | 3/2005 | Wang | H01M 8/04014 429/423 |
| 2005/0175869 A1* | 8/2005 | Blanchet | H01M 8/0625 429/423 |
| 2005/0271914 A1 | 12/2005 | Farooque et al. | |
| 2010/0028730 A1* | 2/2010 | Ghezel-Ayagh | F02C 1/007 429/444 |
| 2010/0028734 A1 | 2/2010 | Ballantine et al. | |
| 2010/0239924 A1* | 9/2010 | McElroy | H01M 8/04007 429/423 |
| 2011/0223507 A1* | 9/2011 | LaVen | H01M 8/04029 429/437 |

FOREIGN PATENT DOCUMENTS

| | | |
|---|---|---|
| JP | 2009048854 A | 3/2009 |
| JP | 2009-99355 A | 5/2009 |
| KR | 10-1138763 B1 | 4/2012 |

OTHER PUBLICATIONS

Luis A.M. Riascos and David D. Pereira, *Optimal Temperature control in PEM fuel cells*, Federal University of ABC (Nov. 3, 2009).

Communication dated Jan. 3, 2017 issued by the European Patent Office in counterpart application No. 12 855 250.2.

* cited by examiner

FUEL CELL SYSTEM AND METHOD FOR DRIVING SAME

TECHNICAL FIELD

This specification relates to a fuel cell system and a method of driving the same.

BACKGROUND ART

In general, a fuel cell generates water and electricity using hydrogen and oxygen. The principle of operation of the fuel cell is that electrons are generated when hydrogen is ionized by the anode and the generated electrons move to the cathode through an electrolyte in the middle. Electrical energy is generated in a process of the electrons moving. A reaction in which water is generated by a reaction of hydrogen and air is an exothermic reaction, and heat and water can be obtained through such a reaction in addition to the electrical energy.

In contrast, a reformed hydrogen compound is used as the fuel of a fuel cell because it is difficult to obtain hydrogen itself that is used as the fuel of a fuel cell. That is, fossil fuel, that is, a compound of carbon and hydrogen, is used as the fuel of a fuel cell.

DISCLOSURE

Technical Problem

An object of this specification is to provide a fuel cell system and a method of driving the same, which are capable of producing stable electricity, improving the load following ability, and increasing both fuel utilization and energy efficiency by dividing and driving a fuel cell into a base load and a load following.

Technical Solution

A fuel cell system in accordance with an embodiment of this specification may include a molten carbonate fuel cell for generating electricity using fuel and discharging gas including unused fuel; a water gas reactor for shifting the discharged gas into water gas; a buffer tank for storing the discharged gas; and a power generation device driven using the fuel of the discharge gas.

In an example related to this specification, the power generation device uses a polymer electrolyte membrane fuel cell for generating electricity using hydrogen gas stored in the buffer tank as an embodiment.

In an example related to this specification, a first waste heat recovery unit connected to the molten carbonate fuel cell and for recovering the heat of the discharge gas; a water gas shift reactor; a drain line for removing condensate water between the water gas converter and the buffer tank; a second waste heat recovery unit for recovering heat from the discharge gas of the water gas shift reactor; a fuel controller coupled between the buffer tank and the polymer electrolyte membrane fuel cell and for controlling the amount of fuel supplied to the polymer electrolyte membrane fuel cell; and a temperature control device installed at each of the water gas shift reactor and the polymer electrolyte membrane fuel cell and for maintaining the temperature of gas within the water gas shift reactor and the polymer electrolyte membrane fuel cell at a predetermined temperature may be further included.

In an example related to this specification, the control unit may monitor the supply and demand state of system electricity connected to a grid in real time, may increase the amount of the fuel supplied from the buffer tank to the polymer electrolyte membrane fuel cell by controlling the fuel controller coupled between the buffer tank and the polymer electrolyte membrane fuel cell when the supply of the electricity is insufficient with respect to the system electricity based on the monitoring results, and may reduce or cut off the amount of the fuel supplied from the buffer tank to the polymer electrolyte membrane fuel cell by controlling the fuel controller coupled between the buffer tank and the polymer electrolyte membrane fuel cell when the supply of the electricity is exceeded with respect to the system electricity based on the monitoring results.

A fuel cell system in accordance with an embodiment of this specification may include a molten carbonate fuel cell; first and the second valves for selectively supplying the discharge gas of the molten carbonate fuel cell; a control unit for controlling the first and the second valves; a water gas shift reactor for shifting the discharge gas of the molten carbonate fuel cell, supplied through the first valve, to water gas; a driving device driven using the hydrogen gas; and an oxidizer for generating heat by oxidizing the discharge gas of the molten carbonate fuel cell supplied through the second valve.

In an example related to this specification, a heat recovery unit for recovering heat generated by the oxidizer may be further included.

Advantageous Effects

The fuel cell system and the method of driving the same in accordance with embodiments of this specification are advantageous in that they can produce stable electricity, improve the load following ability, and increase both fuel utilization and energy efficiency because a fuel cell is divided into a base load and a load following and is driven.

MODE FOR INVENTION

Figure 1:
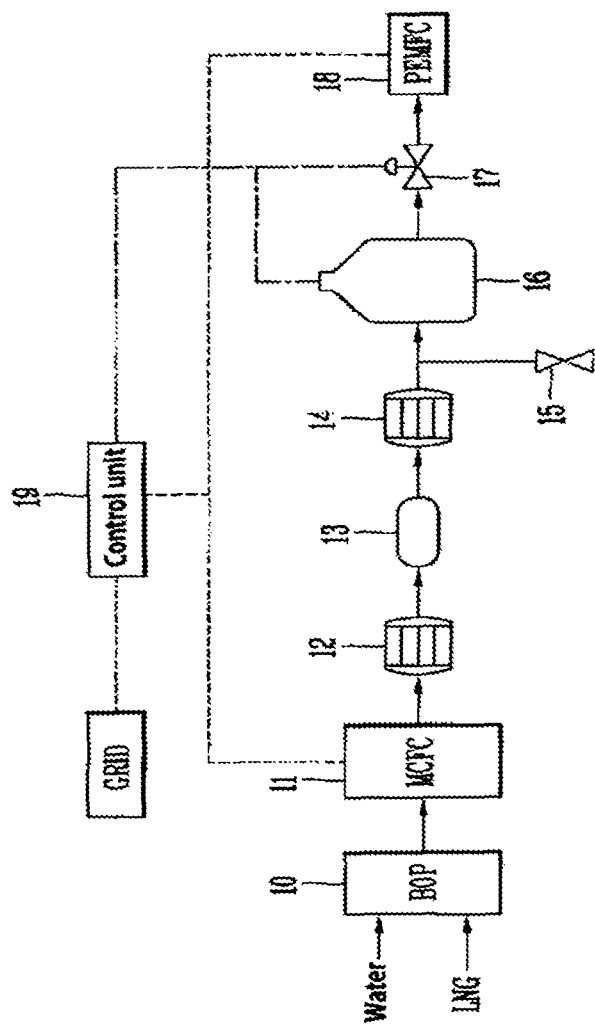
FIG. 1 is a diagram illustrating the configuration of a fuel cell system in accordance with a first embodiment of the present invention.

It is to be noted that technical terms used in this specification are used to describe only specific embodiments and are not intended to limit the present invention. Furthermore, the technical terms used in this specification should be construed as having meanings that are commonly understood by those skilled in the art to which the present invention pertains unless especially defined as different meanings otherwise in this specification, and should not be construed as having excessively comprehensive meanings or excessively reduced meanings. Furthermore, if the technical terms used in this specification are wrong technical terms that do not precisely represent the spirit of the present invention, they should be replaced with technical terms that may be correctly understood by those skilled in the art and understood. Furthermore, common terms used in the present invention should be interpreted in accordance with the definition of dictionaries or in accordance with the context, and should not be construed as having excessively reduced meanings.

Furthermore, an expression of the singular number used in this specification includes an expression of the plural number unless clearly defined otherwise in the context. In this application, terms, such as "comprise" and "include", should not be construed as essentially including all several elements or several steps described in the specification, but the terms may be construed as not including some of the elements or steps or as including additional element or steps.

Furthermore, when one element is described as being "connected" or "coupled" to the other element, it should be understood that one element may be directly connected or coupled to the other element, but a third element may be interposed between the two elements. In contrast, when one element is described as being "directly connected" or "directly coupled" to the other element, it should be understood that a third element is not interposed between the two elements.

Hereinafter, preferred embodiments according to the present invention are described in detail with reference to the accompanying drawings. The same or similar elements are assigned the same reference numerals regardless of their reference numerals, and a redundant description thereof is omitted.

Furthermore, in describing the present invention, a detailed description of the known functions and constructions will be omitted if it is deemed to make the gist of the present invention unnecessarily vague. It is also to be noted that the accompanying drawings are provided to only help easily understand the spirit of the present invention and the spirit of the present invention is limited by the accompanying drawings.

Hereinafter, a fuel cell system capable of producing stable electricity, improving the load following ability, and increasing both fuel utilization and energy efficiency using a Molten Carbonate Fuel Cell (MCFC) that is advantageous for high output as a base load and using a Polymer Electrolyte Membrane Fuel Cell (PEMFC) that is advantageous for a load following, and a method of driving the same are described with reference to FIGS. 1 to 5.

FIG. 1 is a diagram illustrating the configuration of a fuel cell system in accordance with a first embodiment of the present invention.

As shown in FIG. 1, the fuel cell system in accordance with the first embodiment of the present invention includes a Molten Carbonate Fuel Cell (MCFC) 11; a Water Gas Shift (WGS) reactor 13 for shifting the discharge gas of the MCFC 11; a buffer tank 16 for storing hydrogen gas; and a Polymer Electrolyte Membrane Fuel Cell (PEMFC) 18 for being supplied with hydrogen gas from the buffer tank 16 (or various power generation devices driven using hydrogen gas).

The discharge gas of the MCFC 11 means the Anode Off Gas (AOG) of the MCFC 11 (e.g., gas discharged by the anode pole that belongs to the anode pole and cathode pole of the MCFC).

The AOG of the MCFC 11 may include some unreacted fuel (H2 and NG is the minimum) and other gases. The WGS reactor 13 removes some "CO", included in the AOG that deteriorates the performance of the PEMFC 18, through a reaction of $CO+H_2O \rightarrow CO_2+H_2$ so that unreacted fuel is reused by the PEMFC 18.

The fuel cell system in accordance with the first embodiment of the present invention may further include a Balance Of Plant (BOP) 10, a first waste heat recovery unit (or exhaust heat recovery unit) 12, a second waste heat recovery unit 14, a drain line 15, a fuel controller (or a flow controller) 17, and a temperature control device (not shown).

The configuration of the fuel cell system in accordance with the first embodiment of the present invention is described below with reference to FIG. 1.

First, the BOP 10 supplies fuel to the MCFC 11. The BOP 10 is a peripheral device for actuating the MCFC 11, and may include a pump for supplying the fuel to the MCFC 11.

The MCFC 11 produces electricity using the fuel in response to the control signal of a control unit 19. Gas discharged by the MCFC 11 includes unreacted fuel depending on the fuel utilization of the MCFC 11.

The MCFC 11 outputs the discharge gas to the first waste heat recovery unit 12.

The first waste heat recovery unit 12 recovers the heat of the discharge gas, and after the heat is recovered, outputs the discharge gas to the WGS reactor 13.

The WGS reactor 13 generates hydrogen gas having high purity by performing a water gas shift reaction on the discharge gas after the heat is recovered, and outputs the generated hydrogen gas to the buffer tank 16.

The fuel cell system in accordance with the first embodiment of the present invention may further include the second waste heat recovery unit 14 coupled between the WGS reactor 13 and the buffer tank 16. The second waste heat recovery unit 14 may recover the heat of the discharge gas from the WGS reactor 13 and output the heat to the buffer tank 16.

The fuel cell system in accordance with the first embodiment of the present invention may further include the drain line 15 for discharging condensate water according to the discharge and recovery of heat.

The buffer tank 16 stores the hydrogen gas, and outputs the hydrogen gas to the PEMFC 18 as fuel in response to the control signal of the control unit 19. The buffer tank 16 may output the hydrogen gas to the PEMFC 18 as fuel in response to the control signal of the control unit 19.

The PEMFC 18 produces electricity using the fuel in response to the control signal of the control unit 19.

The fuel cell system in accordance with the first embodiment of the present invention may further include the fuel controller 17 coupled between the buffer tank 16 and the PEMFC 18. The fuel controller 17 controls the amount of fuel supplied to the PEMFC 18 in response to the control signal of the control unit 19.

The fuel cell system in accordance with the first embodiment of the present invention may further include a temperature control device (not shown) installed at each of the WGS reactor 13 and the PEMFC 18 and for maintaining the temperature of gas within the WGS reactor 13 and the PEMFC 18 at a predetermined temperature.

The control unit 19 supplies a grid with the electricity generated by the MCFC 11 and the PEMFC 18.

Figure 2:
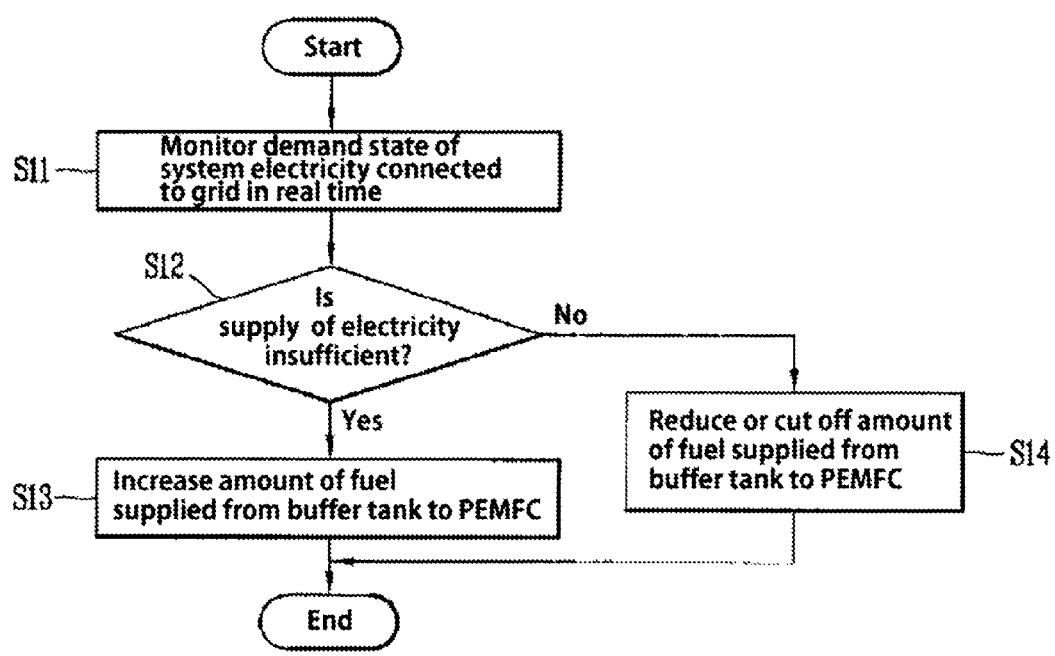
FIG. 2 is a flowchart illustrating a method of driving the PEMFC of the fuel cell system in accordance with a first embodiment of the present invention.

FIG. 2 is a flowchart illustrating a method of driving the PEMFC of the fuel cell system in accordance with a first embodiment of the present invention.

First, the control unit 19 monitors the demand state of system electricity connected to the grid in real time (S11).

If the supply of electricity is insufficient based on the monitoring results with respect to the system electricity (an electricity demand exceeds the capacity of the MCFC 11) (S12), the control unit 19 increases the amount of fuel supplied from the buffer tank 16 to the PEMFC 18 by controlling the fuel controller 17 coupled between the buffer tank 16 and the PEMFC 18 (S13).

In contrast, if the supply of electricity is exceeded with respect to the system electricity, the control unit 19 reduces or cuts off the amount of fuel supplied from the buffer tank 16 to the PEMFC 18 by controlling the fuel controller 17 coupled between the buffer tank 16 and the PEMFC 18 (S14).

The control unit 19 controls the load of the PEMFC 18 and controls a load depending on an electricity demand.

Figure 3:
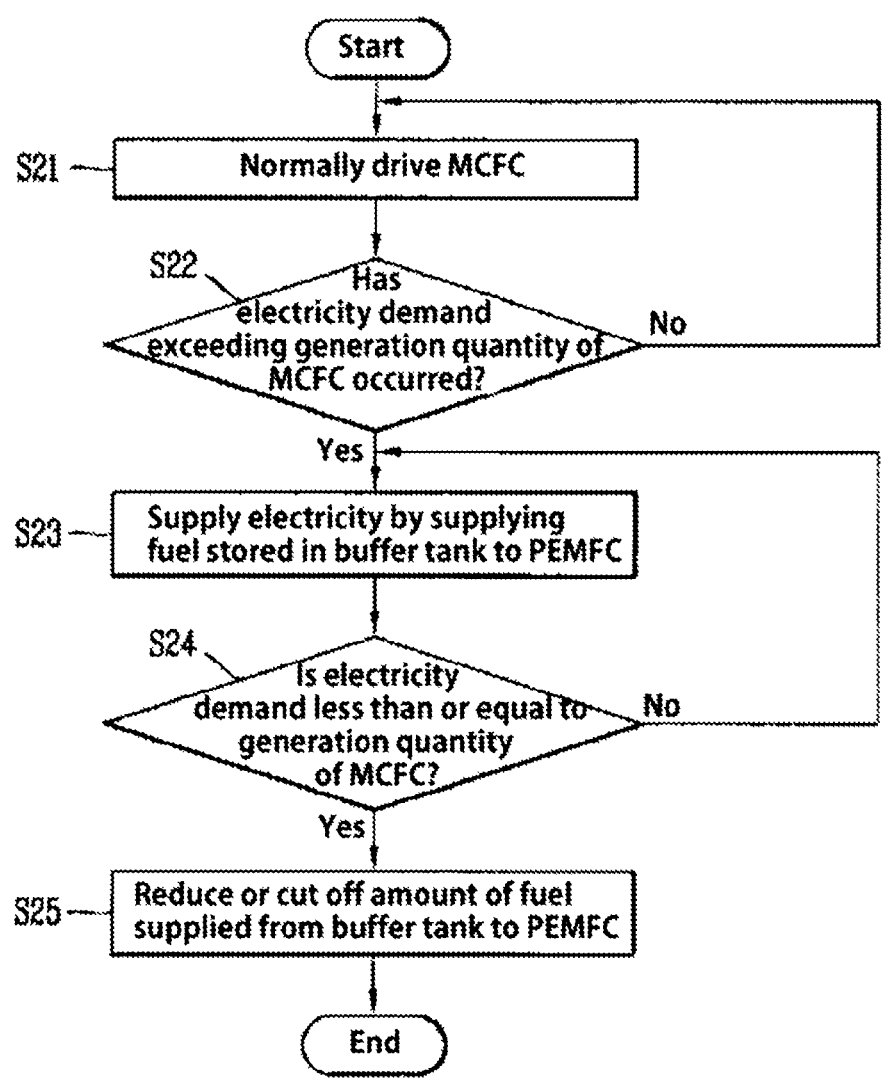
FIG. 3 is a flowchart illustrating a method of driving the fuel cell system in accordance with a first embodiment of the present invention.

FIG. 3 is a flowchart illustrating a method of driving the fuel cell system in accordance with a first embodiment of the present invention.

First, the control unit 19 normally drives the MCFC 11, that is, a base load (S21). For example, the MCFC 11 supplies electricity to the grid in response to the control signal of the control unit 19.

The control unit 19 monitors the demand state of system electricity connected to the grid in real time.

The control unit 19 determines whether or not an electricity demand exceeding the generation quantity of the MCFC 11 has occurred based on the monitoring results (S22).

When an electricity demand exceeding the generation quantity of the MCFC 11 is generated, the control unit 19 generates required electricity by supplying fuel, stored in the buffer tank 16, to the PEMFC 18 by controlling the fuel controller 17 coupled between the buffer tank 16 and the PEMFC 18 (S23).

While supplying the grid with electricity generated by the PEMFC 18, the control unit 19 determines whether or not the electricity demand is less than or equal to the generation quantity of the MCFC 11 (S24). If the electricity demand exceeds the generation quantity of the MCFC 11, the control unit 19 generates electricity, corresponding to the excess quantity, through the PEMFC 18.

In contrast, if the electricity demand is less than or equal to the generation quantity of the MCFC 11, the control unit 19 reduces or cuts off the amount of fuel supplied from the buffer tank 16 to the PEMFC 18 by controlling the fuel controller 17 coupled between the buffer tank 16 and the PEMFC 18 (S25).

Accordingly, the control unit 19 may use the MCFC 11 as a base load, and may use the PEMFC 18 in a load following according to an electricity demand.

Figure 4:
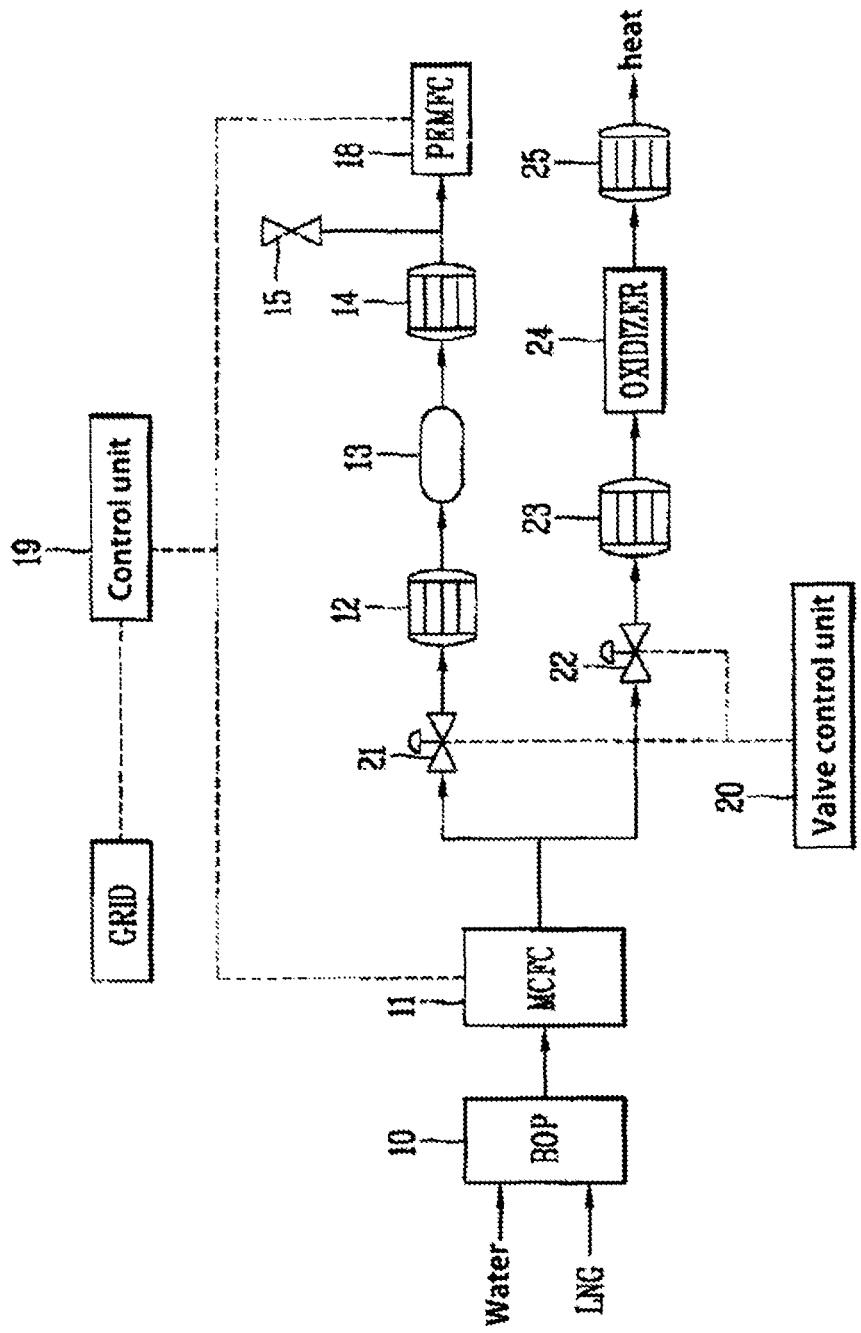
FIG. 4 is a diagram illustrating the configuration of a fuel cell system in accordance with a second embodiment of the present invention.

FIG. 4 is a diagram illustrating the configuration of a fuel cell system in accordance with a second embodiment of the present invention.

As shown in FIG. 4, the fuel cell system in accordance with the second embodiment of the present invention includes a Molten Carbonate Fuel Cell (MCFC) 11; first and second valves 21, 22 for selectively supplying the discharge gas of the MCFC 11; a valve control unit 20 for controlling the first and the second valves 21, 22; a Water Gas Shift (WGS) reactor 13 for shifting the discharge gas of the MCFC 11, supplied through the first valve 21, to water gas; a Polymer Electrolyte Membrane Fuel Cell (PEMFC) 18 for being supplied with hydrogen gas; and an oxidizer (or a catalyst burner) 24 for generating heat by oxidizing the discharge gas of the MCFC 11 supplied through the second valve 22.

The fuel cell system in accordance with the second embodiment of the present invention may further include a Balance Of Plant (BOP) 10, a first waste heat recovery unit 12, a second waste heat recovery unit 14, a drain line 15, a temperature control device (not shown), a third waste heat recovery unit 23, and a fourth waste heat recovery unit 25.

Hereinafter, the configuration of the fuel cell system in accordance with the second embodiment of the present invention is described with reference to FIG. 4.

First, the BOP 10 supplies fuel to the MCFC 11. The BOP 10 is a peripheral device for actuating the MCFC 11, and may include a pump for supplying the fuel to the MCFC 11.

The MCFC 11 produces electricity using the fuel in response to the control signal of the control unit 19. Gas discharged by the MCFC 11 includes unreacted fuel depending on the fuel utilization of the MCFC 11.

If the demand of system electricity exceeds the generation quantity of the MCFC 11, the control unit 19 outputs a first control signal for opening the first valve 21 to the valve control unit 20. If the demand of the system electricity is less than or equal to the generation quantity of the MCFC 11, the control unit 19 outputs a second control signal for opening the second valve 22 to the valve control unit 20.

The valve control unit 20 opens the first valve 21 in response to the first control signal and opens the second valve 22 in response to the second control signal.

The first waste heat recovery unit 12 recovers the heat of the discharge gas supplied through the first valve 21, and outputs the discharge gas from which heat has been recovered to the WGS reactor 13.

The WGS reactor 13 outputs the generated hydrogen gas to the second waste heat recovery unit 14. The WGS reactor 13 may be a WGS reactor for shifting the discharge gas from which heat has been recovered to water gas.

The second waste heat recovery unit 14 recovers the heat of the discharge gas generated by the WGS reactor 13, and then outputs the discharge gas to the PEMFC 18.

The fuel cell system in accordance with the second embodiment of the present invention may further include the drain line 15.

The PEMFC 18 generates electricity using the fuel (including hydrogen gas and water) in response to the control signal of the control unit 19.

The fuel cell system in accordance with the second embodiment of the present invention may further include a temperature control device (not shown) installed at each of the WGS reactor 13 and the PEMFC 18 and for maintaining the temperature of gas within the WGS reactor 13 and the PEMFC 18 at a predetermined temperature.

The control unit 19 supplies a grid with the electricity generated by the MCFC 11 and the PEMFC 18.

The third waste heat recovery unit 23 recovers the heat of the discharge gas supplied by the second valve 22, and outputs the discharge gas from which heat has been recovered to the oxidizer 24.

The oxidizer 24 generates heat by oxidizing the discharge gas from which heat has been recovered, and outputs the generated heat to the fourth waste heat recovery unit 25. The fourth waste heat recovery unit 25 may operate as a heat recovery unit for recovering the generated heat.

Figure 5:
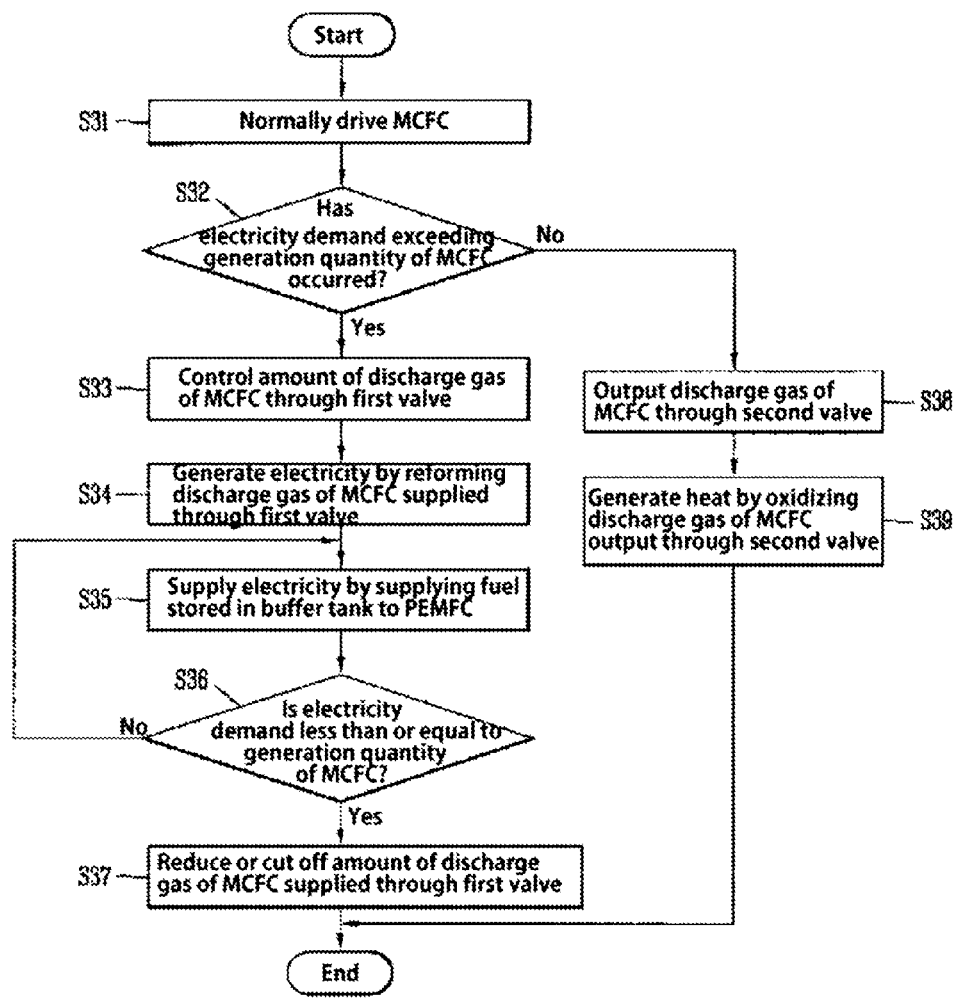
FIG. 5 is a flowchart illustrating a method of driving the fuel cell system in accordance with the second embodiment of the present invention.

FIG. 5 is a flowchart illustrating a method of driving the fuel cell system in accordance with the second embodiment of the present invention.

First, the control unit 19 normally drives the MCFC 11, that is, a base load (S31).

The control unit 19 determines whether or not an electricity demand exceeding the generation quantity of the MCFC 11 has occurred based on the monitoring results (S32).

If the demand of system electricity exceeds the generation quantity of the MCFC 11, the control unit 19 outputs the first control signal for opening the first valve 21 to the valve control unit 20. The control unit 19 may output the first control signal for controlling the first valve 21 to the valve control unit 20 so that discharge gas corresponding to electricity currently required for the system electricity is output to the first waste heat recovery unit 12 based on "the amount of discharge gas corresponding to previously calculated and required electricity".

The valve control unit 20 opens the first valve 21 in response to the first control signal, and the first valve 21 outputs the discharge gas to the first waste heat recovery unit 12. The first valve 21 may output the amount of discharge gas, corresponding to the required electricity, to the first waste heat recovery unit 12 under the control of the valve control unit 20 (S33).

The first waste heat recovery unit 12 recovers the heat of the discharge gas and outputs the discharge gas from which heat has been recovered to the WGS reactor 13. The WGS reactor 13 performs a water gas shift reaction on the discharge gas from which heat has been recovered, and outputs the fuel to the PEMFC 18 through the second waste heat recovery unit 14 (S34).

The PEMFC 18 generates required electricity using the fuel (including hydrogen gas and water) (S35).

While supplying the grid with the electricity generated by the PEMFC 18, the control unit 19 determines whether or not the electricity demand is less than or equal to the generation quantity of the MCFC 11 (S36). If the electricity demand still exceeds the generation quantity of the MCFC 11, the control unit 19 generates electricity corresponding to the excess quantity through the PEMFC 18.

In contrast, if the electricity demand is less than or equal to the generation quantity of the MCFC 11, the control unit 19 reduces or cuts off the amount of the discharge gas of the MCFC 11 supplied through the first valve 21 (S37).

If the demand of the system electricity is less than or equal to the generation quantity of the MCFC 11, the control unit 19 reduces the open rate of the first valve 21, and outputs the second control signal for increasing the open rate of the second valve 22 to the valve control unit 20.

The valve control unit 20 increases the open rate of the second valve 22 in response to the second control signal, and the second valve 22 outputs the discharge gas to the third waste heat recovery unit 23 (S38).

The third waste heat recovery unit 23 recovers the heat of the discharge gas output through the second valve 22, and outputs the discharge gas from which heat has been recovered to the oxidizer 39.

The oxidizer 39 generates heat by oxidizing the discharge gas from which heat has been recovered, and outputs the discharge gas to the fourth waste heat recovery unit 25 (S39). The oxidizer 39 discharges high-temperature gas by burning fuel that remains within the discharge gas of the MCFC 11, which may be used as waste heat of good quality that is advantageous for heat discharge and recovery.

INDUSTRIAL APPLICABILITY

As described above, the fuel cell system and the method of driving the same in accordance with embodiments of the present invention can produce stable electricity, improve the load following ability, and increase both fuel utilization and energy efficiency by dividing and driving the fuel cell into the base load and the load following.

Those skilled in the art may change and modify the present invention in various ways without departing from the essential characteristic of the present invention. Accordingly, the disclosed embodiments should not be construed as limiting the technical spirit of the present invention, but should be construed as illustrating the technical spirit of the present invention. The scope of the technical spirit of the present invention is not restricted by the embodiments, and the scope of the present invention should be interpreted based on the following appended claims. Accordingly, the present invention should be construed as covering all modifications or variations derived from the meaning and scope of the appended claims and their equivalents.

The invention claimed is:

1. A fuel cell system, comprising:
   a molten carbonate fuel cell, wherein the molten carbonate fuel cell discharges discharged gas;
   a balance of plant configured to supply fuel to the molten carbonate fuel cell;
   a first valve and a second valve for selectively supplying the discharged gas;
   a valve control unit connected to the first valve and the second valve;
   a water gas shift reactor for shifting the discharged gas, supplied through the first valve, to water gas;
   a power generation device capable of being driven using the water gas;
   an oxidizer for generating heat by oxidizing the discharged gas of the molten carbonate fuel cell supplied through the second valve;
   a first discharge heat recovery unit connected to the molten carbonate fuel cell and for recovering heat of the discharged gas;
   a second discharge heat recovery unit for recovering heat of the water gas that the water gas shift reactor discharges;
   a third discharge heat recovery unit connected to the second valve and for recovering heat of the discharged gas that is supplied by the second valve; and
   a fourth discharge heat recovery unit connected to the oxidizer and for recovering heat that is output from the oxidizer;
   wherein the power generation device is a polymer electrolyte membrane fuel cell for generating electricity using the water gas.

2. The fuel cell system of claim 1, further comprising a drain line for discharging condensate water generated from the first discharge heat recovery unit and/or the second discharge heat recovery unit.

3. The fuel cell system of claim 1, further comprising a temperature control device installed at the water gas shift reactor and/or the polymer electrolyte membrane fuel cell and for maintaining temperature of gas within the water gas shift reactor and/or the polymer electrolyte membrane fuel cell at a predetermined temperature.

4. The fuel cell system of claim 1, further comprising a control unit for controlling output of the molten carbonate fuel cell and the polymer electrolyte membrane fuel cell driven using fuel within the water gas.

5. The fuel cell system of claim 4, wherein the control unit monitors a supply and demand state of system electricity in real time, increases an amount of fuel supplied to the polymer electrolyte membrane fuel cell by controlling the first valve and the second valve using the valve control unit if a supply of electricity is insufficient with respect to the system electricity based on the monitoring results, and reduces or cuts off an amount of fuel supplied to the power generation device by controlling the first valve and the second valve using the valve control unit if a supply of electricity is exceeded with respect to the system electricity based on the monitoring results.

* * * * *